Figure 3:
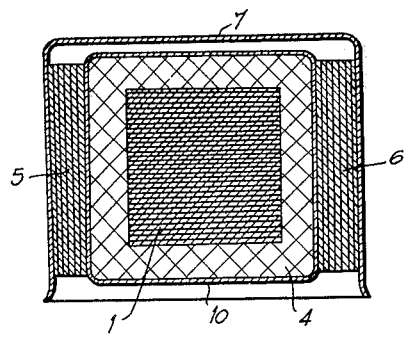

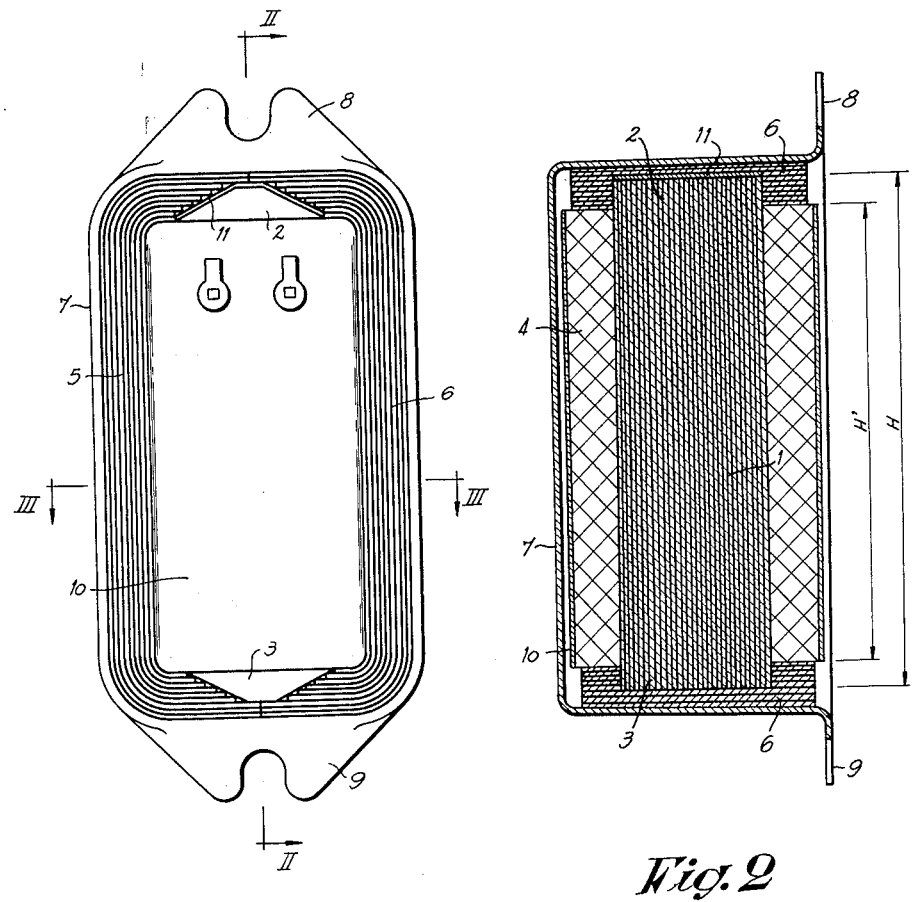

INVENTOR
Emile Lekens
BY Richards & Geier
ATTORNEYS

United States Patent Office 3,090,935
Patented May 21, 1963

3,090,935
TRANSFORMERS, CHOKE-COILS AND ALL SIMILAR DEVICES, AND SPECIAL STAMPINGS USED THEREFOR
Emile Lekens, Kapelstraat 197, Aartselaar, Belgium
Filed Aug. 10, 1959, Ser. No. 832,743
Claims priority, application Belgium Sept. 4, 1958
1 Claim. (Cl. 336—212)

The invention concerns improvements brought more especially to choke-coils and all similar devices essentially based on the fact that the core of this induction device is designed for having a greater width outside than inside the coil, and this in such way that the magnetic circuit might be shortened with respect to the traditional core, for the same winding. This core is generally made up by the superposition of stampings which are duly bent and whose widths differ in such way that the part of the stampings lying inside the coil be less than the width of the part of the stampings lying outside the coil, and this under conditions which will result in a shortening of the magnetic circuit.

The new characteristics refer to a particularly novel and rational design of the internal and external parts of the core, with the purpose of introducing surprising facilities into the manufacturing and assembling process, resulting in faster work and in considerable savings in aforesaid manufacturing process.

Substantially, this new design consists in preparing, independently of each other, the constituent elements of the internal and external parts of the core and in juxtaposing these constituent parts when assembling the choke-coil in its housing.

The constituent elements of the internal part of the core—with respect to the winding—are made of piled-up strips the length of which is slightly greater than the height of the winding, the ends of these strips being preferably of gradually decreasing sections. These ends may be either triangular or rounded-off, or have any other profile of progressively decreasing cross-section. The overall length of these strips or of a stack of strips is slightly less than that of the hollow in the housing.

The constituent elements of the outer part of the core are made up of stacked strips whose ends are bent so as to form two stacks of elongated U-form disposed on either side of the coil, whereby the ends of the stacked strips are arranged in steps so as to follow approximately the shape of the adjacent ends of the internal part of the core. Near one of the ends of the latter, a dielectric can be inserted between the constituent elements of the internal part of the core on the one hand, and of the external part on the other, so as to protect the outgoing leads.

The constituent elements of the internal part of the core, the winding, and the constituent elements of the external part of the core are such, with respect to shape and dimensions, that they fill completely the appropriate housing, aforesaid constituent elements of the external part of the core being so to say clamped between the outer cover of the winding and the corresponding part of the walls of the housing. The latter is kept very small.

If the housing must only contain a single choke-coil, this housing can act simultaneously as enveloping and clamping element; if, on the other hand, several choke-coils are to be inserted in the same housing, each choke-coil will have to be enveloped or clamped individually before being introduced therein, after which it can be introduced into the common housing.

These new features can be applied in a wide variety of shapes and dimensions.

Figure 4:
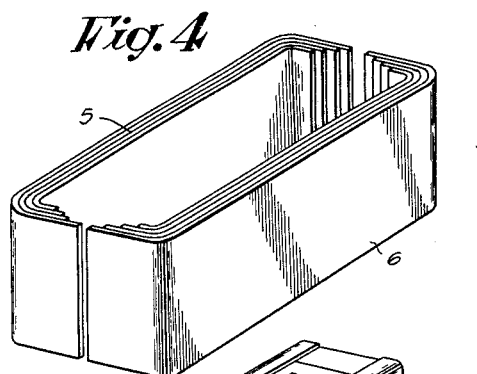
Figure 5:
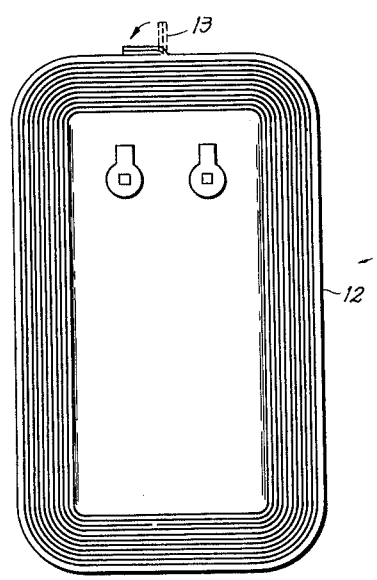

The example described in greater detail below does not imply any limitations and refers to the appended drawings of which:

FIGURE 1 is a top view of a choke-coil made according to the present improvements;
FIGURE 2 is a cross-sectional by a perpendicular plane along line II—II of FIGURE 1;
FIGURE 3 is a cross-section by a perpendicular plane along line III—III of FIGURE 1;
FIGURE 4 is an exploded view showing the constituent elements of the choke-coil represented in the aforementioned figures;
FIGURE 5 is a diagrammatic representation of a choke-coil ready to be introduced into a housing intended for containing several choke-coils.

In this form of embodiment, the internal part of the core consists of a stack 1 of iron stampings whose ends 2—3 have a gradually diminishing cross-section and whose over-all length H exceeds the length H' of the winding 4.

The external elements of the core are made of two stacks 5—6 of iron stampings whose ends are bent at right angles and whose lengths are gradually diminishing, in such way that aforesaid external elements form, so to say, an extension of the internal part 1 of the core. The whole is pressed into a housing 7 provided on either side with fastening lugs 8—9 respectively. The winding 4 is surrounded by a paper covering 10. A small strip of cardboard or of paper 11 is inserted between one of the ends, 2 for instance, of the internal part of the core and the adjacent ends of the stacks 5—6 forming the external elements of aforesaid core, this strip acting as a protection for the outgoing leads.

As represented in the appended drawing, aforesaid external stacks 5—6 are clamped between the actual coil and the walls of the housing.

It should be noted in particular that the internal as well as the external portion of the cores are made up of very simple parts and that the assembly of the choke-coils requires very little time indeed and is in any case quite systematic without any possible hazards, and this without requiring any skilled labour or specialized tools.

It will also be noted that there is practically no waste of material.

If several choke-coils must be introduced into a common housing, aforesaid choke-coils, as summarily and diagrammatically shown in FIGURE 5, will have previously been enveloped or clamped. This preparatory operation can be performed by applying a strip of metal 12 surrounding the choke-coil, the ends of aforesaid strip being brought together and welded, by point-welding for instance, the free end 13 of this welding being subsequently bent over.

The choke-coils which have thus been prepared can be fitted almost instantly into their common housing.

It will be noticed that, by bending over aforesaid end 13, strip 12 is given, so to say, a certain tightening which at the same time is an excellent way of adjusting the constituent parts of the choke-coil core.

It has thus been possible to produce on an industrial scale choke-coils of considerably reduced size, with the greatest of ease, of swiftness and economy.

What is claimed is:

An induction device, comprising, in combination, an inner core consisting of a stack of superposed iron stampings of the same size and having elongated rectangular bodies and angularly converging front and rear ends of gradually diminishing cross-section, a winding tightly enclosing said rectangular bodies, a paper cover tightly enclosing said winding, whereby said winding with said paper cover has the form of an elongated rectangular body with said angular front and rear ends extending beyond the rectangular body, and an outer core consisting of two similar stacks of iron stampings, the iron stampings of the two stacks of the outer core extending perpendicularly to the iron stampings of the stack of the inner core, the two stampings of the outer core having elongated body portions tightly engaging the opposite sides of said rectangular body, and further having end portions extending at right angles to said body portions and enclosing said front and rear ends of the iron stampings of the inner core stack, said end portions having gradually diminishing lengths contacting said front and rear ends and corresponding to said front and rear ends, whereby said end portions of the iron stampings of the outer core stacks constitute a continuation of said front and rear ends of the iron stampings of the inner core stack and whereby the width of said outer core is substantially equal to the combined thickness of said inner core and said winding, said outer core having two parallel side surfaces and two parallel end surfaces extending perpendicularly to said side surfaces, a slot separating the stacks of the outer core being located in the middle of each of said end surfaces, and a prismatic housing tightly enclosing said outer core and having inner surfaces in contact with the side and end surfaces of the outer core.

References Cited in the file of this patent

UNITED STATES PATENTS

| | | |
|---|---|---|
| 461,135 | Stanley | Oct. 13, 1891 |
| 1,992,822 | Granfield | Feb. 26, 1935 |
| 2,582,351 | Olson | Jan. 15, 1952 |
| 2,806,212 | Kuhn | Sept. 10, 1957 |
| 2,815,492 | Henderson | Dec. 3, 1957 |

FOREIGN PATENTS

| | | |
|---|---|---|
| 7,856 | Great Britain | 1889 |
| 563,517 | Great Britain | Aug. 17, 1944 |